United States Patent Office 2,784,226
Patented Mar. 5, 1957

2,784,226

N-(CYCLOPROPYLMETHYL)-CYCLOHEXYLAMINE

Weldon G. Brown, Chicago, Ill., assignor to Commercial Solvents Corporation, Terre Haute, Ind., a corporation of Maryland No Drawing. Application August 4, 1953,
Serial No. 372,396

4 Claims. (Cl. 260—563)

My invention relates to a new compound having analgetic activity. More particularly, my invention relates to the new compound N-(cyclopropylmethyl)cyclohexylamine.

In the past a large number of substances have been used as analgetics, both products of nature and synthetic compounds. All of these substances have suffered from one or more serious disadvantages when used to produce analgesia. Some of them produce very strong reactions such as depression, nausea, ataxia, etc. Still others are only slightly effective and give no relief against pronounced pain.

I have now discovered a new compound which is fully effective as an analgetic and free from the undesirable toxic side reaction encountered with other analgetics. My new compound is N(cyclopropylmethyl)cyclohexylamine and acid salts thereof.

My new compound can be produced by any suitable means. I prefer to prepare the new compound by first reacting cyclopropanecarboxylic acid with thionyl chloride to produce cyclopropanecarbonyl chloride which latter material is then reacted with cyclohexylamine to produce N-cyclohexylcyclopropanecarboxamide. The amide is then reduced by the use of lithium aluminum hydride to produce the N-(cyclopropylmethyl)cyclohexylamine. Salts of the amine can be prepared by interaction of the amine in aqueous solution with the desired acid and evaporating the mixture to dryness. The residue can be recrystallized using aqueous organic solvents such as, for example, moist acetone.

The following examples are offered to illustrate the production of N-(cyclopropylmethyl)cyclohexylamine.

EXAMPLE I

A 56-gram portion of thionyl chloride was heated on a water bath and to it was added over a period of 1 hour 34 grams of cyclopropane carboxylic acid. The evolved gases were absorbed in water. When all of the acid was added, the mixture was heated for one-half hour on a water bath and then distilled to obtain crude cyclopropanecarbonyl chloride boiling between 70 and 110° C. The crude material was then purified by distillation to obtain 31.5 grams of cyclopropanecarbonyl chloride boiling at 109–112° C. A 25-gram portion of the cyclopropanecarbonyl chloride was added slowly to a stirred mixture of 50 grams of cyclohexylamine in 250 ml. of benzene. N-cyclohexylcyclopropanecarboxamide and cyclohexylamine hydrochloride precipitated. The precipitate was washed with water in which the cyclohexylamine hydrochloride dissolved leaving white crystalline N-cyclohexylcyclopropanecarboxamide which was recrystallized from 95% alcohol to obtain 30.5 grams of white crystalline N-cyclohexylcyclopropanecarboxamide having a melting point of 138–139° C. A 15-gram portion of N-cyclohexylcyclopropanecarboxamide was run into a refluxing solution of 4 grams of lithium aluminum hydride in 400 ml. of ether by means of a Soxhlet apparatus, the addition being made over a period of about 15 hours. At the end of this period excess hydride was destroyed with water and 10% sodium hydroxide added to dissolve the alumina. The ether layer was then separated and the basic layer washed several times with 75-ml. portions of ether. The ether extracts were combined and evaporated to obtain a residue which was treated with 5% aqueous solution of hydrochloric acid. The resulting solution was filtered to remove 3.7 grams of unreacted amide. The solution was then neutralized with NaOH, extracted with ether and the ether evaporated to obtain 9.0 grams of N-(cyclopropylmethyl)cyclohexylamine as a liquid oil.

EXAMPLE II

N-(cyclopropylmethyl)-cyclohexylamine was dissolved in an aqueous solution of concentrated hydrochloric acid. The solution was then evaporated to dryness under reduced pressure on a water bath at a temperature of 30–45° C. The residue was crystallized from moist acetone to yield N-(cyclopropylmethyl)cyclohexylamine hydrochloride having melting point of 274.5–275° C.

EXAMPLE III

An ether solution of N-(cyclopropylmethyl)cyclohexylamine was extracted in an aqueous solution of concentrated hydrochloric acid. The acid extract was then evaporated to dryness under reduced pressure in a water bath at a temperature of 30–45° C. The residue was crystallized from moist acetone to yield N-(cyclopropylmethyl)cyclohexylamine hydrochloride.

My new composition has been found to exert a pronounced analgetic effect in the body. The results of tests for analgesia induced by oral administration of N-(cyclopropylmethyl)cyclohexylamine hydrochloride to rats are set out in Table I below.

The method used to test for analgesia was a modification of the Ercoli-Lewis method set forth in the Journal of Pharmacology and Experimental Therapeutics, volume 84, p. 301 (1943). The apparatus consisted essentially of a 2000 watt clear light bulb as a source of radiant heat, a biconvex lens to focus the heat rays, a shutter to cut off the heat stimulus and a cellophane screen on which the radiant heat was focussed. The light bulb was surrounded by a water-cooled jacket which had a window in the side to transmit the heat. Ten rats were tested at a dosage level of 25 ml. of N-(cyclopropylmethyl)cyclohexylamine hydrochloride per kg. of body weight and five rats were tested as controls. The ears of the test animals were used as a site for stimulation because in this manner, two determinations could be made on each animal. The ear was held at the focal point of the radiant heat of the cellophane screen, the shutter was opened, and the time for the rat to respond to this pain stimulus was determined by means of a stop watch. When the stimulus became painful the rat would withdraw or twitch its ear. This response served as the end point. All rats tested were free of apparent toxic symptoms at the conclusion of the test. In Table I a mean increase in reaction time of greater than 0.3 second is significant.

Table I

ANALGETIC ACTIVITY OF N-CYCLOPROPYL-METHYLCYCLOHEXYLAMINE HYDROCHLORIDE

| Dose, mg./kg. of Body Wt. | Change in Reaction Time in Seconds at Indicated Periods After Administration | | | | | | | | |
|---|---|---|---|---|---|---|---|---|---|
| | Control | ½ hr. | 1 hr. | 1½ hr. | 2 hr. | 2½ hr. | 3 hr. | 3½ hr. | 4 hr. |
| 0 (Control) | 0 | −0.02 | 0 | +0.02 | +0.02 | +0.02 | 0 | 0 | −0.04 |
| 25 | 0 | +0.45 | +1.01 | +0.83 | +0.83 | +0.70 | +0.47 | +0.10 | +0.04 |

The acute intraperitoneal toxicity of my new compound has been determined in mice. The following table shows the results of the determinations:

Table II
TOXICITY $LD_0 = 100$ mg./kg.
$LD_{50} = 130 \pm 10$ mg./kg.
$LD_{100} = 150$ mg./kg.

The results in Table II are expressed in milligrams of my new composition per kilogram of body weight of the test mice.

Now having described my invention, what I claim is:

1. As a new composition of matter, a compound selected from the group consisting of N-(cyclopropylmethyl)cyclohexylamine and salts thereof.

2. As a new composition of matter, a compound selected from the group consisting of N-(cyclopropylmethyl)cyclohexylamine and mineral acid salts thereof.

3. N-(cyclopropylmethyl)cyclohexylamine.

4. N-(cyclopropylmethyl)cyclohexylamine hydrochloride.

References Cited in the file of this patent

Skita: "Berichte" (1915), vol. 48, 1685–98.